United States Patent
Harris

(10) Patent No.: US 9,937,875 B2
(45) Date of Patent: Apr. 10, 2018

(54) VEHICLE ENTERTAINMENT CENTER ASSEMBLY WITH HANGER

(71) Applicant: Victor Harris, Dubai (AE)

(72) Inventor: Victor Harris, Dubai (AE)

(73) Assignee: NSV Group FZCO, Dubai (AE)

( * ) Notice: Subject to any disclaimer, the term of this patent is extended or adjusted under 35 U.S.C. 154(b) by 0 days.

(21) Appl. No.: 15/341,966

(22) Filed: Nov. 2, 2016

(65) Prior Publication Data

US 2018/0056889 A1   Mar. 1, 2018

Related U.S. Application Data

(60) Provisional application No. 62/379,586, filed on Aug. 25, 2016.

(51) Int. Cl.
| | |
|---|---|
| A47C 7/62 | (2006.01) |
| A47C 7/72 | (2006.01) |
| B60R 11/02 | (2006.01) |
| B60N 2/48 | (2006.01) |
| B60N 2/64 | (2006.01) |

(52) U.S. Cl.
CPC ............ B60R 11/0247 (2013.01); B60N 2/48 (2013.01); B60N 2/64 (2013.01); *B60R 2011/0276* (2013.01)

(58) Field of Classification Search
CPC ................ B60R 11/00; B60R 11/0235; B60R 2011/0015; B60N 2/20
USPC ... 297/188.01, 188.04, 188.06, 217.3, 217.4, 297/217.5
See application file for complete search history.

(56) References Cited

U.S. PATENT DOCUMENTS

| | | | | |
|---|---|---|---|---|
| 7,070,237 B2 * | 7/2006 | Rochel | ................ | B60R 11/0235 297/217.3 X |
| 7,111,814 B1 * | 9/2006 | Newman | ............. | B60R 11/0211 297/188.06 X |
| 7,201,443 B2 * | 4/2007 | Cilluffo | ................ | B60N 2/4876 297/188.04 X |
| 7,360,649 B2 * | 4/2008 | Swaim | ................. | A45C 7/0095 297/188.06 X |
| 7,810,880 B2 * | 10/2010 | Spellman | ............. | B60N 2/4876 297/188.06 X |
| 7,857,176 B2 * | 12/2010 | Schedivy | ................ | B60R 11/02 297/188.06 X |
| 8,109,569 B2 * | 2/2012 | Mitchell | ............. | B60R 11/0235 297/217.3 X |
| 8,136,777 B2 * | 3/2012 | Brawner | ............. | B60R 11/0235 297/188.06 X |
| 8,730,413 B2 * | 5/2014 | Tranchina | ........... | B60R 11/0235 348/837 |

(Continued)

FOREIGN PATENT DOCUMENTS

WO    WO2015077834 A1    6/2015

*Primary Examiner* — Rodney B White
(74) *Attorney, Agent, or Firm* — Quinn IP Law

(57) ABSTRACT

An accessory assembly operatively connected to vehicle seat includes a housing having a front surface and an opposing rear surface. A screen is disposed on the rear surface of the housing. A hanger cooperates with and is removably connected to the housing. The hanger includes a central portion having a cavity and first and second shoulder portions extending from opposing ends of the central portion. A support is mounted to the rear surface of the housing and disposed below the screen configured to receive a portable electronic device.

15 Claims, 10 Drawing Sheets

(56) References Cited

U.S. PATENT DOCUMENTS

| | | | |
|---|---|---|---|
| 8,864,226 B2* | 10/2014 | Fan | B60N 3/004 297/188.06 X |
| 9,290,271 B2* | 3/2016 | Schurg | B64D 11/06 |
| 9,446,719 B2* | 9/2016 | Lee | B60R 11/0252 |
| 9,452,717 B2* | 9/2016 | Dry | B60R 11/02 |
| 9,457,731 B2* | 10/2016 | Narayanan | B60R 11/02 |
| 9,511,862 B2* | 12/2016 | Thiele | B64D 11/06 |
| 9,731,660 B2* | 8/2017 | Mitchell | B60R 11/0252 |
| 9,758,248 B2* | 9/2017 | Procter | B64D 11/00152 |
| 2003/0121943 A1* | 7/2003 | Chou | B60R 7/043 224/275 |
| 2004/0239155 A1 | 12/2004 | Fourrey et al. | |
| 2006/0032996 A1* | 2/2006 | Wu | A47C 7/72 248/218.4 |
| 2006/0079306 A1* | 4/2006 | Zheng | B60R 11/0235 455/575.9 |
| 2006/0082212 A1* | 4/2006 | Chou | B60R 7/043 297/463.1 |
| 2008/0185886 A1* | 8/2008 | Li | B60N 2/4876 297/217.3 |
| 2008/0252798 A1* | 10/2008 | Vitito | B60K 35/00 348/837 |
| 2011/0278885 A1* | 11/2011 | Procter | B60R 11/0235 297/188.04 X |
| 2012/0018471 A1* | 1/2012 | Guillermo | B60R 11/0235 224/275 |
| 2012/0125959 A1* | 5/2012 | Kucera | B60R 11/0235 224/275 |
| 2012/0248833 A1* | 10/2012 | Hontz | B60N 3/004 297/188.05 |
| 2013/0181492 A1* | 7/2013 | Prescott | B60R 7/088 297/217.1 |
| 2014/0015289 A1 | 1/2014 | Fan | |
| 2014/0077539 A1* | 3/2014 | Brawner | B60R 11/02 297/217.3 |
| 2014/0077576 A1 | 3/2014 | Brawner | |
| 2014/0284973 A1* | 9/2014 | Wolgast | B64D 11/0015 297/188.04 |
| 2015/0115009 A1 | 4/2015 | Stauber | |
| 2015/0244127 A1* | 8/2015 | Kim | B60N 3/14 439/34 |
| 2017/0120839 A1* | 5/2017 | Harris | B60R 11/0235 |
| 2017/0120840 A1* | 5/2017 | Harris | B60R 11/02 |
| 2017/0240119 A1* | 8/2017 | Tezino | B60R 11/00 |

* cited by examiner

VEHICLE ENTERTAINMENT CENTER ASSEMBLY WITH HANGER

CROSS REFERENCE TO RELATED APPLICATIONS

This application claims the benefit of U.S. Provisional Patent Application No. 62/379,586, entitled "VEHICLE ENTERTAINMENT CENTER ASSEMBLY WITH HANGER," filed on Aug. 25, 2016, the content of which is hereby incorporated by reference in its entirety.

TECHNICAL FIELD

The present disclosure relates to a vehicle entertainment center assembly.

BACKGROUND

Electronic devices, such as smart phones, tablets, personal digital assistants (PDAs), global position systems (GPS), and the like are widely used by passengers of vehicles. Some of these electronic devices provide the benefit of portability, allowing the passengers to bring the device with them, for use in the vehicle, while also allowing the passengers to take the device with them as they exit the vehicle. Other electronic devices can be integrated into the vehicle.

SUMMARY

The present disclosure provides a vehicle entertainment center accessory assembly attachable to a seat of a vehicle, such as to a rear-facing side of a vehicle seat. The accessory assembly includes a housing having a front surface and an opposing rear surface. A screen is disposed on the rear surface of the housing. A hanger cooperates with the housing and includes a central portion and first and second shoulder portions extending from opposing ends of the central portion. A support is mounted to the rear surface of the housing and disposed below the screen configured to receive a portable electronic device.

The support may include a body having a first end including a plurality of openings configured to align with a plurality of openings in a lower extremity of the housing and a second end including a receiving member configured to receive the portable electronic device. An arm extends from the second end of the body and is configured to receive and support a portion of the portable electronic device and cooperate with the second end of the body to define an opening for the portion of the portable electronic device.

The opening in the receiving member may face rearward relative to the housing. The receiving member may include a hook having a C-shaped opening configured to receive the portion of the portable electronic device. Alternatively, the receiving member may include a hook having a U-shaped opening configured to receive the portion of the portable electronic device such as a headphone listening device.

In another embodiment of the disclosure, an accessory module includes a housing having a front surface and an opposing rear surface and a screen disposed on the rear surface of the housing. A hanger cooperates with the housing and includes a central portion and first and second shoulder portions extending from opposing ends of the central portion. A support is mounted to the rear surface of the housing and disposed below the screen configured to receive a portable electronic device. The support further includes a body having a first end including a plurality of openings configured to align with a plurality of openings in a lower extremity of the housing and a second end including a receiving member configured to receive the portable electronic device.

An arm extends from the second end of the body and is configured to receive and support a portion of the portable electronic device and cooperate with the second end of the body to define an opening for the portion of the portable electronic device. The opening in the receiving member may face rearward relative to the housing. The receiving member may include a hook having a C-shaped opening configured to receive the portion of the portable electronic device. Alternatively, the receiving member may include a hook having a U-shaped opening configured to receive the portion of the portable electronic device.

In yet another embodiment of the disclosure, a vehicle seat includes a seat bottom and a seat back having a lower end adjustably connected to and positionable relative to the seat bottom and an upper end. A headrest is operatively connected to the upper end of the seat back. An accessory assembly is disposed proximate and operatively connected to the seat back.

The accessory assembly includes a housing having a front surface and an opposing rear surface. A screen is disposed on the rear surface of the housing. A hanger cooperates with the housing and includes a central portion and first and second shoulder portions extending from opposing ends of the central portion. A support is mounted to the rear surface of the housing and disposed below the screen configured to receive a portable electronic device.

The support may include a body having a first end including a plurality of openings configured to align with a plurality of openings in a lower extremity of the housing and a second end including a receiving member configured to receive the portable electronic device. An arm extends from the second end of the body and is configured to receive and support a portion of the portable electronic device and cooperate with the second end of the body to define an opening for the portion of the portable electronic device.

The opening in the receiving member may face rearward relative to the housing. The receiving member may include a hook having a C-shaped opening configured to receive the portion of the portable electronic device. Alternatively, the receiving member may include a hook having a U-shaped opening configured to receive the portion of the portable electronic device.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims.

Figure 1:
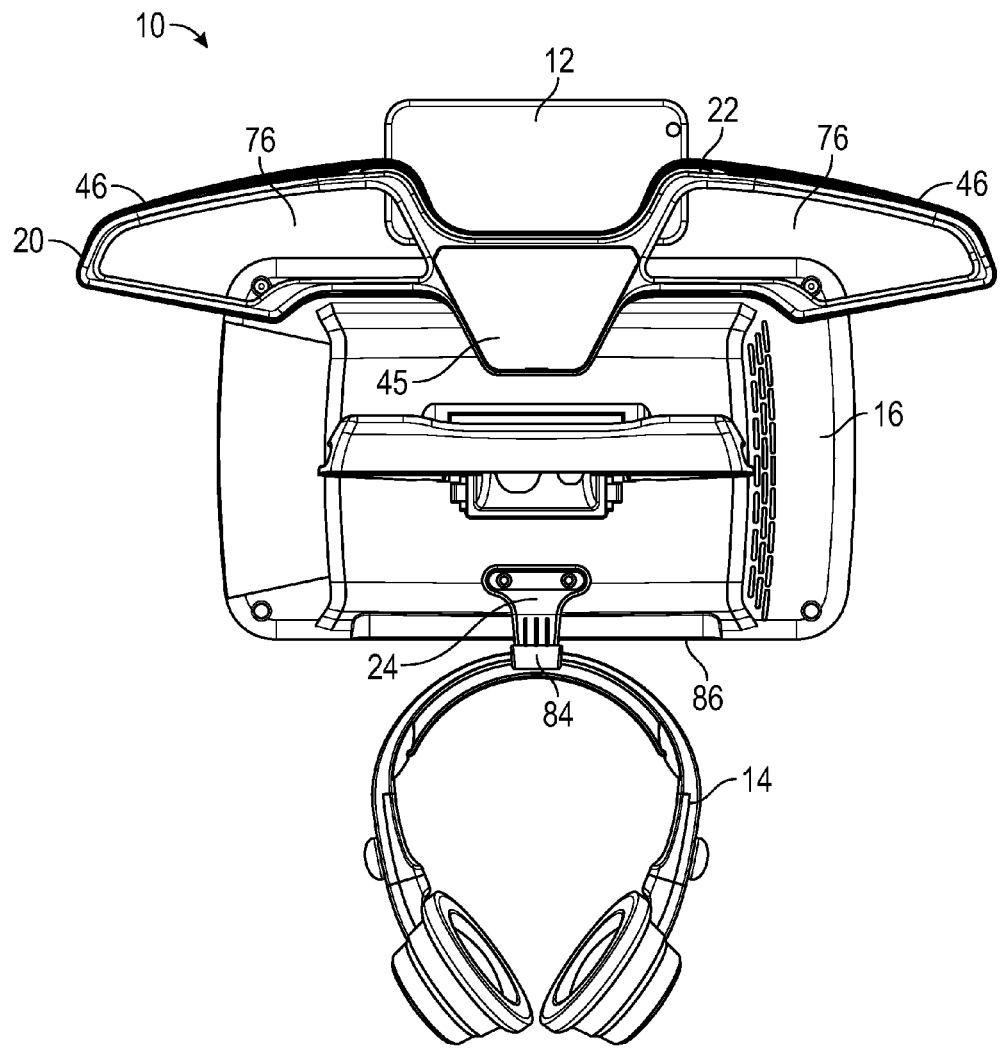
FIG. 1 is a schematic illustration in front view of an embodiment of a vehicle entertainment center accessory assembly shown supporting a cell phone and a headphone set.

Referring to the Figures, wherein like numerals indicate like or corresponding parts throughout the several views, FIG. 1 shows a front view of an embodiment of a vehicle entertainment center accessory assembly (VECAA) 10 shown supporting an object 12 such as a cell phone or other portable electronic device and a headphone set 14. As used herein "front" and "rear" as used to describe the VECAA 10 are considered relative to the position of the VECAA 10 when mounted in the vehicle 30 of FIG. 4.

Figure 4:
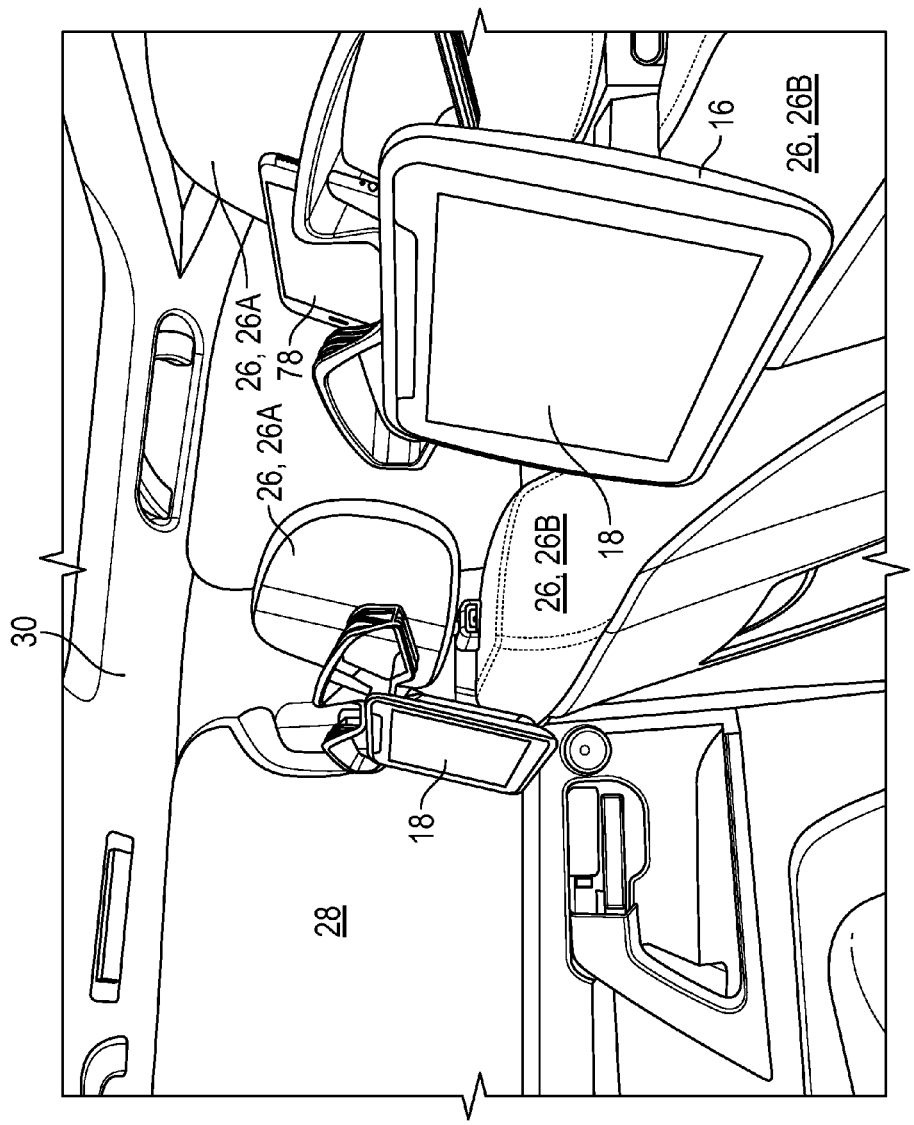
FIG. 4 is a schematic illustration in fragmentary perspective view of a vehicle including two of the vehicle entertainment center accessory assemblies of FIG. 1.
Figure 5:
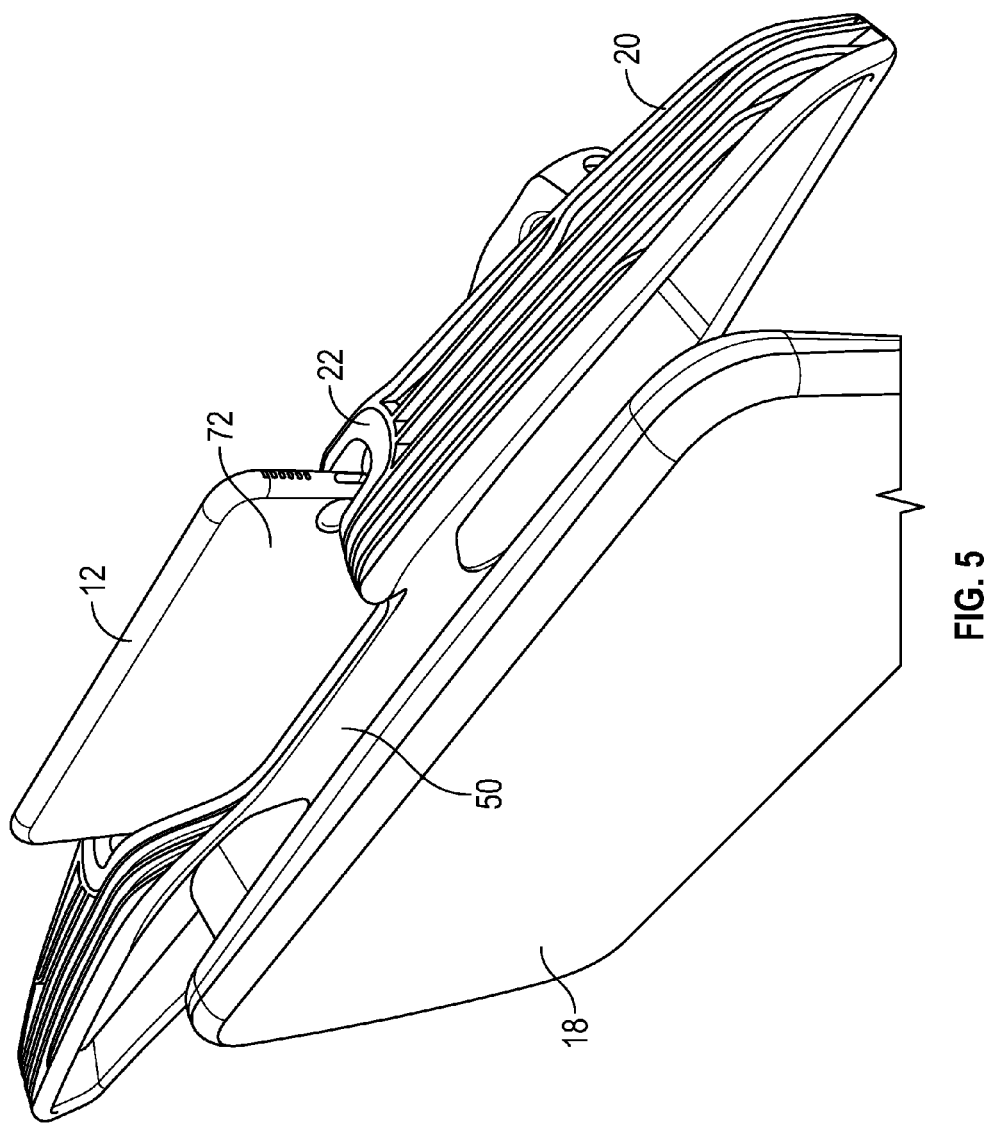
FIG. 5 is a schematic illustration in fragmentary perspective rear view of the vehicle entertainment center accessory assembly of FIG. 1 shown supporting the cell phone.

The VECAA 10 includes an electronic display device 16 that includes a housing 17 that supports a screen 18 (best shown in FIGS. 4 and 5). The VECAA also includes a hanger 20 with an insert 22, and a headphone support 24. The housing 17 of the electronic display device 16 includes a front surface 36 and an opposing rear surface that receives and supports the screen 18 thereon. As will be described in greater detail below, the front and rear surfaces of the housing 17 cooperate to define and form an upper surface therebetween.

As best shown in FIG. 4, the VECAA 10 is configured to be mounted to a seat assembly 26 in a passenger compartment 28 of a vehicle 30 so that the display screen 18 generally faces rearward and is exposed to view to a vehicle passenger seated in a seat rearward of the seat assembly 26. The seat assembly 26 may include a seat bottom adjustably connected to a lower portion of the passenger compartment 28 and a seat back 26B having a lower end adjustably connected to and positionable relative to the seat bottom. FIG. 4 shows two VECAAs 10, one mounted to each of a driver's seat assembly 26 and a front passenger seat assembly 26. The seat assemblies 26 each include a respective headrest 26A that is operatively connected an upper end of the seat back 26B.

Figure 2:
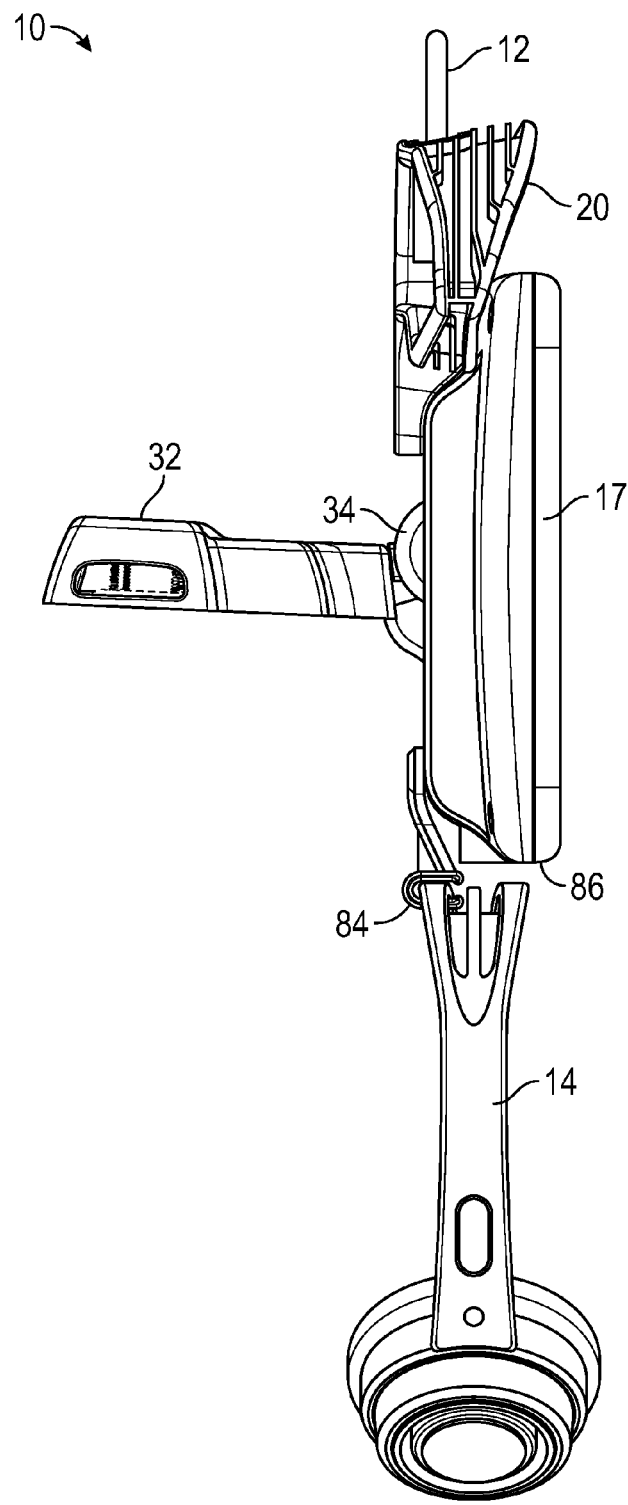
FIG. 2 is a schematic illustration in side view of the vehicle entertainment center accessory assembly of FIG. 1 shown supporting the cell phone and the headphone set.
Figure 6:
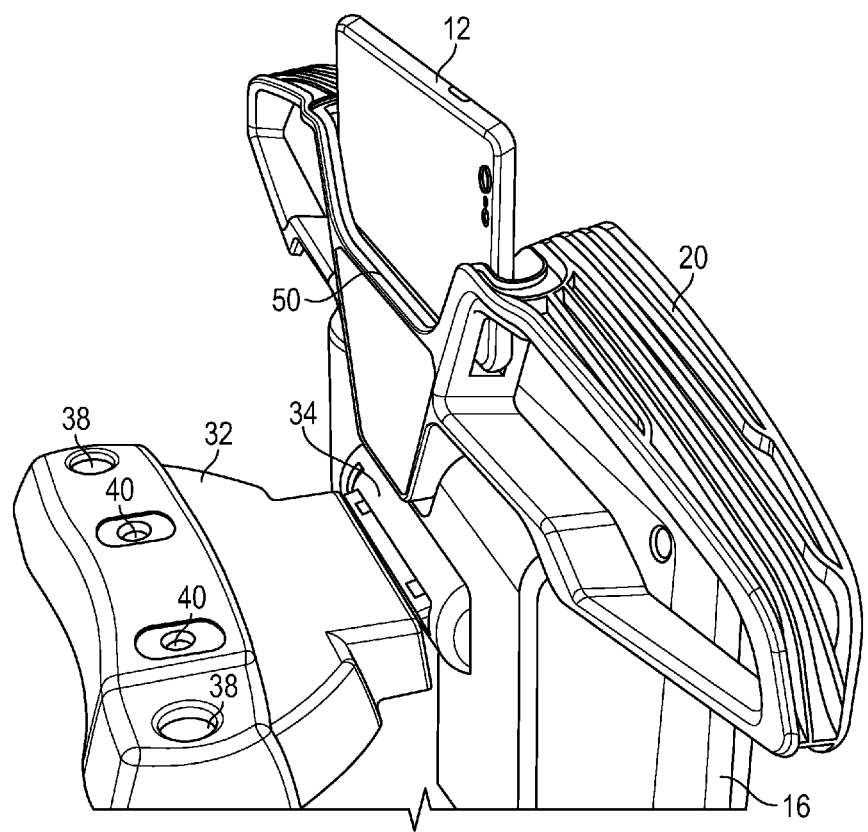
FIG. 6 is a schematic illustration in fragmentary perspective front view of the vehicle entertainment center accessory assembly of FIG. 1 shown supporting the cell phone.

With reference to FIGS. 2 and 6, the VECAA 10 includes a mounting structure 32 extending from the front surface 36 of the housing 17 secured to mounting features 34 on the front side or front surface 36 of the electronic display device 16. The mounting structure 32 includes headrest post openings 38 through which the headrest posts of the headrest 26A may extend so that the mounting structure 32 is mounted to the seat back 26B of the seat assembly 26. Other fastener openings 40 may receive fasteners used to mount the VECAA 10 to the seat assembly 26. Alternatively, the mounting features 34 on the housing 17 of the electronic display device 16 may allow the electronic display device 16 to be easily removable from the mounting structure 32, for example, such as to remove the electronic display device 16 from the vehicle 30 if desired, while the mounting structure 32 remains mounted to the seat assembly 26.

Figure 3:
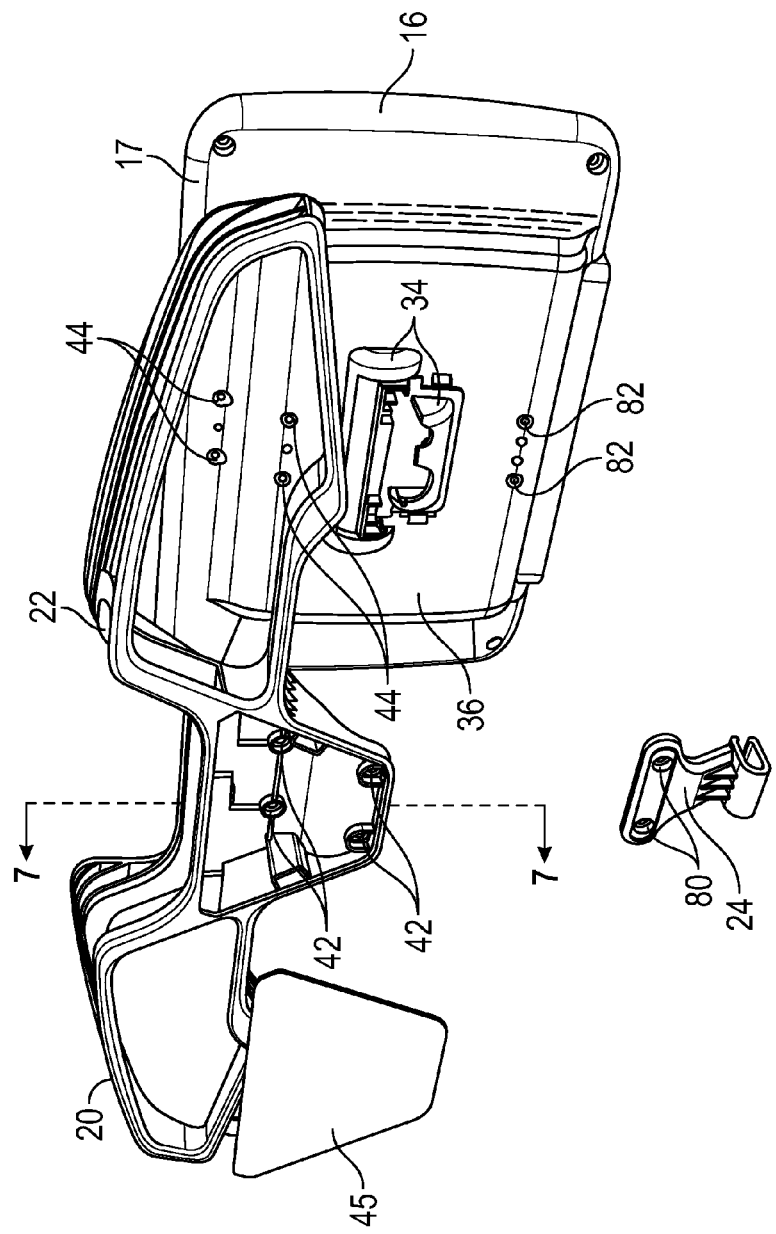
FIG. 3 is a schematic illustration in partially exploded and perspective view of the vehicle entertainment center accessory assembly of FIG. 1.

With reference to FIG. 3, the hanger 20 mounts to the front side 36 of the electronic display device 16. More specifically, the hanger 20 includes a plurality of fastener openings 42 that align with corresponding fastener openings 44 extending into the housing 17 of the electronic display device 16. Fasteners (not shown) extend through the aligned openings 42, 44 to mount the hanger 20 to the front side 36. A cover 45 may be provided to cover the openings 42. The cover 45 may clip or otherwise secure to the hanger 20.

When mounted as described, the hanger includes a central portion 50 and at least one shoulder portion 46 extending from the central portion 50. As shown in the Figures, the at least one shoulder portion 46 includes first and second shoulders 46 of the hanger 20 that extend from opposing ends of the central portion 50 and behind and at least partially above and laterally outward of the electronic display device 16, as best shown in FIG. 1. The hanger 20 is thus offset from the screen 18 and does not block any portion of the screen 18 to provide a pleasurable viewing experience. This also allows an article of clothing (not shown) to be hung on the shoulders 46 of the hanger 20 without interfering with the electronic display device 16. By way of non-limiting example, the clothing may be a coat, a shirt, a suit jacket, etc., that can be hung on the hanger 20.

The hanger 20 is incorporated and integrated in the VECAA 10 by mounting and securing the hanger to the housing 17 of the display device 16, as described herein, provides space savings and an aesthetic pleasing appearance inside the passenger compartment 28 of the vehicle 30 and eliminates the need to have a separate hanger in another location in the vehicle. The hanger 20 is disposed between the electronic display device 16 and the seat assembly 26 when mounted to the seat assembly 16 as shown in FIG. 4, which may allow the clothing to fit generally between the electronic display device 16 and the seat assembly 26 in some instances so that the screen 18 is not covered by the clothing. Alternatively, clothing hanging on the hanger 20 may partially or completely cover the screen 18.

Figure 7:
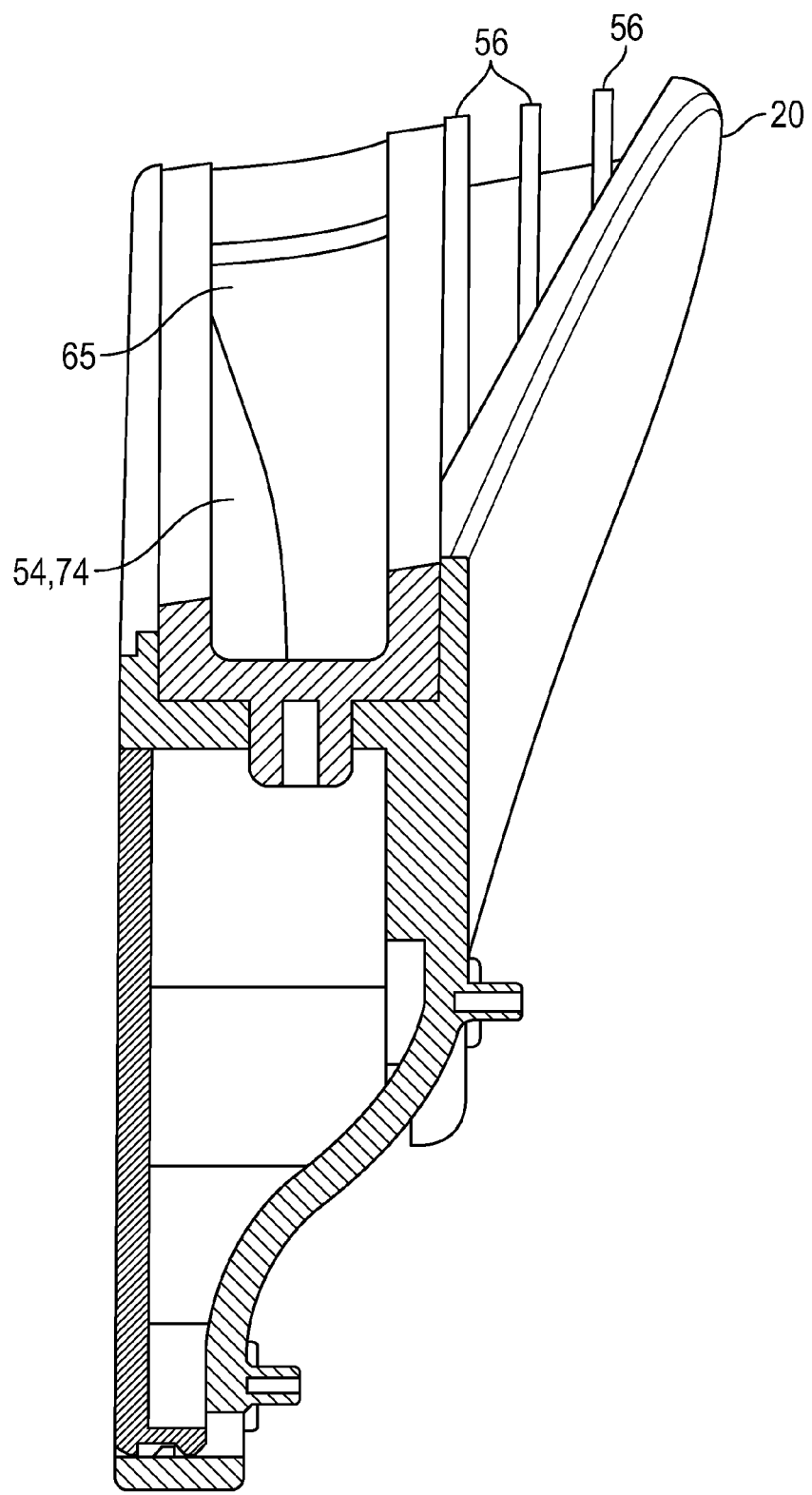
FIG. 7 is a schematic illustration in cross-sectional view of a hanger and cell phone insert of the vehicle entertainment center accessory assembly of FIG. 1 taken at lines 7-7 in FIG. 1.
Figure 8:
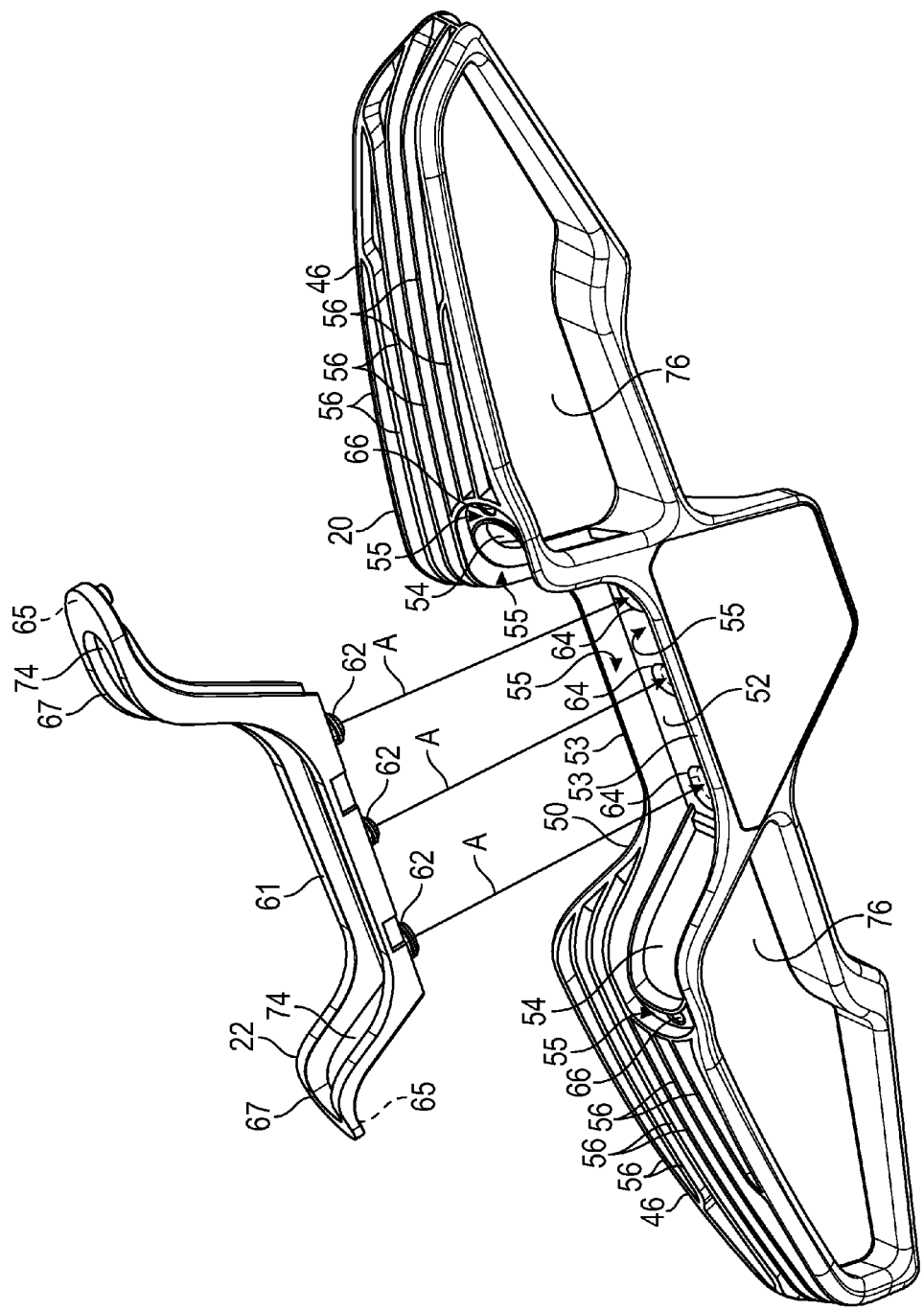
FIG. 8 is a schematic illustration in fragmentary perspective front view of the hanger and cell phone insert of FIG. 7.
Figure 9:
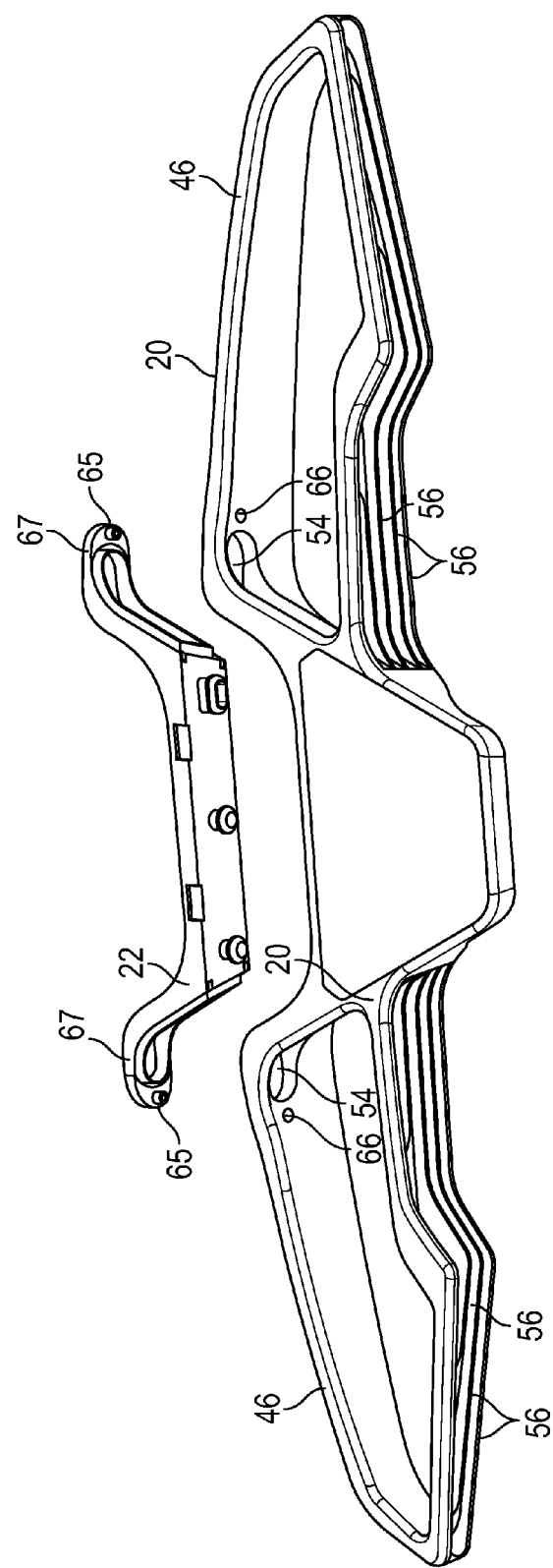
FIG. 9 is a schematic illustration in exploded perspective view of the hanger and insert of FIG. 1.

With reference to FIGS. 5-8, the hanger 20 has a central portion 50 that defines a recessed cavity 52 that opens generally upward when the VECAA 10 is installed in the vehicle 30 of FIG. 4. Opposing sidewalls 53 extend at fore and aft sides of the cavity 52 between the first and second shoulder portions 46 to define the cavity 52. The first and second shoulder portions 46 of the hanger 20 further define at least one slot 54 that extend through the hanger 20 between the shoulders 46 and disposed proximate the central portion 50. Moreover, the shoulders 46 have a plurality of elongated ribs 56 extending along their lengths. The ribs 56 strengthen the shoulders 46 while affording a reduction in mass in comparison to shoulders of an entirely solid section of the thickness of the ribs 56. As shown in FIG. 9, a lower portion of the shoulders 46 also include ribs 56.

The VECAA 10 includes an insert 22 that is configured to be received within and removably connected to the recessed cavity 52 so that it lines the inner surface 55 of the hanger 20 in the cavity 52. As best shown in FIGS. 7 and 8, the insert 22 has a central portion 61 with protrusions 62 that align with openings 64 in the central portion 50 of the hanger 20 and may be inserted into the openings 64 to secure the insert 22 to the hanger 20. FIG. 8 shows arrows A indicating a direction of insertion of the insert 22.

The insert 22 may be a compliant material, such as rubber. The compliant material allows the protrusions 62 to yield when being inserted into the openings 64 so that the insert 22 is interference fit to the hanger 20. Additional protrusions 65 of the insert 22, best shown in FIG. 9, align with openings 66 in the hanger 20 to secure shoulders 67 of the insert 22 to the hanger 20 above the slots 54. The compliant material of the insert 22 also allows the insert 22 to prevent slip of an object (such as cell phone 12 in FIG. 1) placed in the cavity 52 and supported on the insert 22. The insert 22 thus in effect grips the phone 12 to prevent movement of the phone 12 relative to the hanger 20, protecting the phone 12 and preventing rattling noise of the phone 12 against the hanger 20.

The insert 22 defines a channel 74 between the central portion 61 and the shoulders 67. Channel 74 aligns with the slots 54 of the hanger 20 when the insert 22 is secured to the hanger 20. The aligning slots 54 and channel 74 enable an object such as the phone 12 to extend through the aligned slots 54 and channel 74 into a space 76 bounded by the hanger 20 as shown in FIG. 1. Cell phones 12 of various sizes can be supported on the combined hanger 20 and insert 22 in part due to the greater width afforded by the open slots 54 and channel 74 in comparison to the width of the cavity 52 alone. Moreover, the space 76 reduces the mass of the hanger 20 in comparison to a hanger of solid material filling the space 76.

As best shown in FIG. 4, when the cell phone 12 is supported by the hanger 20 and insert 22, a screen 78 of the cell phone 12 is visible to a rear seat occupant simultaneously with the screen 18. Control buttons and ports disposed along the outer periphery of the cell phone 12 are also exposed.

Figure 11:
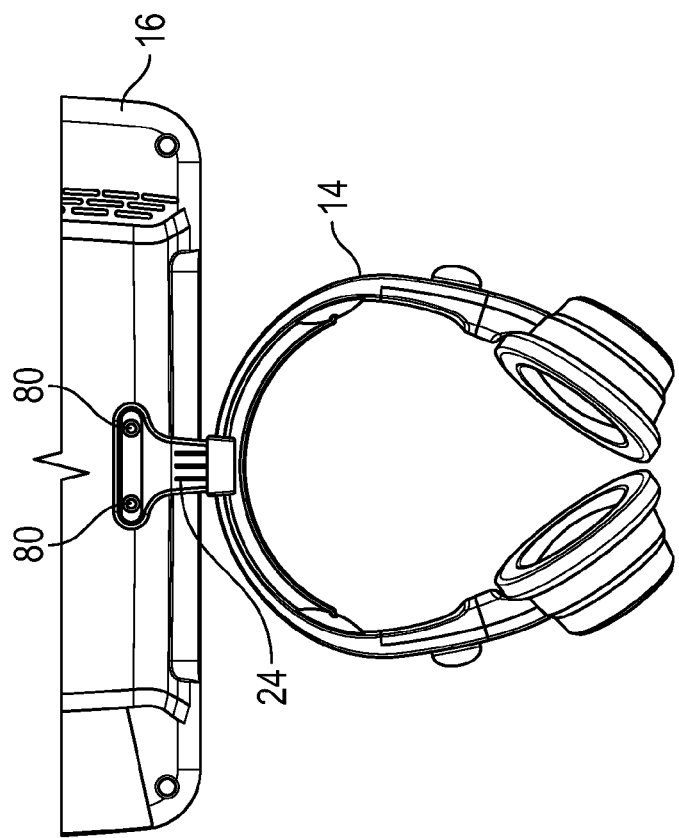
FIG. 11 is a schematic fragmentary illustration in front view of the vehicle entertainment center accessory assembly of FIG. 1 shown supporting the headphone set.
Figure 10:
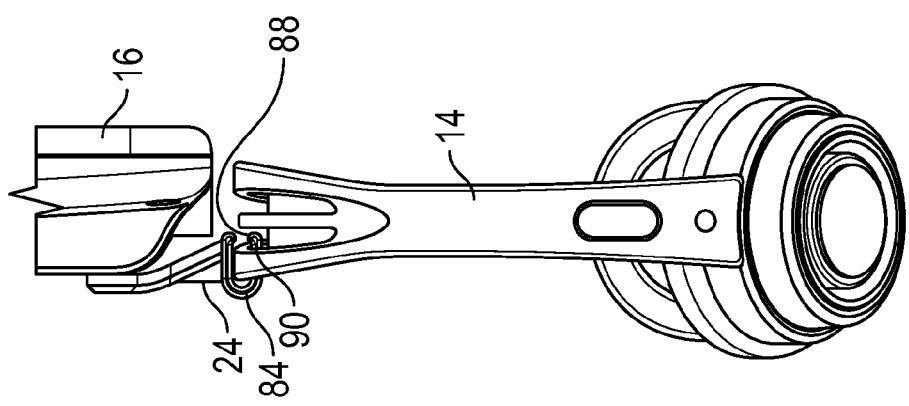
FIG. 10 is a schematic illustration in fragmentary side view of the vehicle entertainment center accessory assembly of FIG. 1 shown supporting the headphone set.

FIGS. 3, 10, and 11 best show the headphone support 24. The headphone support 24 includes a body having a first end including a plurality of openings 80 that align with openings 82 in the housing 17 to receive fasteners by which the headphone support 24 is secured to the housing 17. The second end of the body of the headphone support 24 includes a hook or receiving member 84 that is configured to be disposed below a lower extremity 86 of the housing 17 shown in FIG. 2.

The receiving member 84 cooperates with the second end of the body of the headphone support to form a generally U-shaped or C-shaped opening 88 that faces rearward relative to the housing (i.e., toward a rear seat passenger and opposite the lower extremity of the housing). The receiving member 84 has an arm 90 that is disposed generally horizontally to support an object placed into the opening 88, such as the headphone set 14. Because the opening 88 faces rearward, the headphone set 14 is easily placed on and removed from the receiving member 84. The receiving member 84 may be a material of suitable strength to support the headphone set 14, and may provide suitable surface friction to minimize sliding of the headphone set 14 relative to the receiving member 84.

In other embodiments, the hanger 20 and the electronic display device 16 can include and can attach to one another via fasteners, openings, holes, slots, grooves, clips, tabs, snaps, friction or interference fit features, adhesive, welding, soldering, etc. In certain embodiments, the hanger 20 and the electronic display device 16 can be formed as one piece.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An accessory assembly configured to be operatively connected to a vehicle seat, the accessory assembly comprising:
   a housing having a front surface and an opposing rear surface;
   a screen disposed on the rear surface of the housing;
   a hanger cooperating with the housing having a central portion and first and second shoulder portions extending from opposing ends of the central portion; and
   a support mounted to the rear surface of the housing and disposed below the screen configured to receive a portable electronic device;
   wherein the support includes a body having a first end defining a plurality of openings configured to align with a plurality of openings in a lower extremity of the housing and a second end including a receiving member configured to receive the portable electronic device; and
   wherein the receiving member includes an arm extending from the second end of the body configured to receive and support a portion of the portable electronic device and cooperating with the second end of the body to define an opening for the portion of the portable electronic device.

2. The accessory assembly of claim 1 wherein the opening in the receiving member faces rearward relative to the housing.

3. The accessory assembly of claim 2 wherein the opening in the receiving member further comprises a hook including a C-shaped opening configured to receive the portion of the portable electronic device.

4. The accessory assembly of claim 2 wherein the opening in the receiving member further comprises a hook including a U-shaped opening configured to receive the portion of the portable electronic device.

5. The accessory assembly of claim 1 wherein the portable electronic device received in the receiving member is a headphone listening device.

6. The accessory assembly of claim 1 further comprising a mounting structure extending from the front surface of the housing to operatively connect the housing to the vehicle seat.

7. An accessory assembly comprising:
a housing having a front surface and an opposing rear surface;
a screen disposed on the rear surface of the housing;
a hanger cooperating with the housing having a central portion and first and second shoulder portions extending from opposing ends of the central portion; and
a support mounted to the rear surface of the housing and disposed below the screen configured to receive a portable electronic device,
wherein the support includes a body having a first end defining a plurality of openings configured to align with a plurality of openings in a lower extremity of the housing and a second end including a receiving member configured to receive the portable electronic device; and
wherein the receiving member includes an arm extending from the second end of the body configured to receive and support a portion of the portable electronic device and cooperating with the second end of the body to define an opening for the portion of the portable electronic device.

8. The accessory assembly of claim 7 wherein the opening in the receiving member faces rearward relative to the housing.

9. The accessory assembly of claim 8 wherein the opening in the receiving member further comprises a hook including a C-shaped opening configured to receive the portion of the portable electronic device.

10. The accessory assembly of claim 8 wherein the receiving member is positioned proximate to the rear surface of the housing seat such that the portable electronic device does not obstruct the screen when disposed in the receiving member.

11. The accessory assembly of claim 8 wherein the opening in the receiving member further comprises a hook including a U-shaped opening configured to receive the portion of the portable electronic device.

12. A vehicle seat comprising:
a seat bottom;
a seat back having a lower end adjustably connected to and positionable relative to the seat bottom and an upper end;
a headrest operatively connected to the upper end of the seat back; and
an accessory assembly disposed proximate and operatively connected to the seat back, the assembly including:
a housing having a front surface and an opposing rear surface,
a screen disposed on the rear surface of the housing,
a hanger cooperating with the housing having a central portion and first and second shoulder portions extending from opposing ends of the central portion, and
a support mounted to the rear surface of the housing and disposed below the screen configured to receive a portable electronic device;
wherein the support includes a body having a first end defining a plurality of openings configured to align with a plurality of openings in a lower extremity of the housing and a second end including a receiving member configured to receive the portable electronic device; and
wherein the receiving member includes an arm extending from the second end of the body configured to receive and support a portion of the portable electronic device and cooperating with the second end of the body to define an opening for the portion of the portable electronic device.

13. The vehicle seat of claim 12 wherein the opening in the receiving member faces rearward relative to the housing.

14. The vehicle seat of claim 13 wherein the opening in the receiving member further comprises a hook including a C-shaped opening configured to receive the portion of the portable electronic device.

15. The vehicle seat of claim 13 wherein the opening in the receiving member further comprises a hook including a U-shaped opening configured to receive the portion of the portable electronic device.

* * * * *

UNITED STATES PATENT AND TRADEMARK OFFICE
CERTIFICATE OF CORRECTION

PATENT NO. : 9,937,875 B2  
APPLICATION NO. : 15/341966  
DATED : April 10, 2018  
INVENTOR(S) : Victor Harris Page 1 of 1

It is certified that error appears in the above-identified patent and that said Letters Patent is hereby corrected as shown below:

In the Claims

Column 7, Lines 32-37, Claim 10 should read as:
10. The accessory assembly of claim 8 wherein the receiving member is positioned proximate to the rear surface of the housing such that the portable electronic device does not obstruct the screen when disposed in the receiving member.

Signed and Sealed this
Fourth Day of September, 2018

Andrei Iancu
*Director of the United States Patent and Trademark Office*